(12) United States Patent
Asou et al.

(10) Patent No.: US 8,091,941 B2
(45) Date of Patent: Jan. 10, 2012

(54) LOWER STRUCTURE OF VEHICLE BODY REAR PART

(75) Inventors: Masahiro Asou, Hamamatsu (JP); Takayuki Souma, Hamamatsu (JP); Norio Nishida, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 12/948,981

(22) Filed: Nov. 18, 2010

(65) Prior Publication Data

US 2011/0121597 A1    May 26, 2011

(30) Foreign Application Priority Data

Nov. 26, 2009 (JP) ................... 2009-268720

(51) Int. Cl.
  *B62D 43/00* (2006.01)
(52) U.S. Cl. .................... 296/37.2; 296/187.11
(58) Field of Classification Search ............. 296/37.2, 296/187.11
  See application file for complete search history.

(56) References Cited

U.S. PATENT DOCUMENTS

| 6,231,097 B1 * | 5/2001 | Schell et al. ............. 296/37.2 |
| 6,672,639 B2 * | 1/2004 | Kosuge et al. ............ 296/37.2 |
| 7,540,559 B2 * | 6/2009 | Egawa et al. ........... 296/203.04 |

FOREIGN PATENT DOCUMENTS

| JP | 10-316050 A | 12/1998 |
| JP | 2007-276605 A | 10/2007 |

* cited by examiner

*Primary Examiner* — Joseph Pape
(74) *Attorney, Agent, or Firm* — Alston & Bird LLP

(57) ABSTRACT

A lower structure of a vehicle body rear part includes a spare tire housing formed on a rear floor, a rear cross member disposed in front of the spare tire housing to connect side frames, and a hook reinforcing member extending in the vehicle longitudinal direction. The side frame at the vehicle rear of the rear cross member is divided into a frame front part and a frame rear part in the vehicle longitudinal direction, and the hook reinforcing member is divided into a reinforcing member front part and a reinforcing member rear part in the vehicle longitudinal direction. The lower structure is configured so that when a load F is applied from the vehicle rear to a vehicle body rear part, the side frame is deformed so as to be bent in an upward convex shape at a division position of the frame front part and the frame rear part, and also the rear floor and the hook reinforcing member are deformed so as to be bent in a downward convex shape at a division position of the reinforcing member front part and the reinforcing member rear part.

6 Claims, 5 Drawing Sheets

LOWER STRUCTURE OF VEHICLE BODY REAR PART

BACKGROUND OF THE INVENTION

1. Field of the Invention

The present invention relates to a lower structure of a vehicle body rear part of a vehicle provided with a spare tire housing formed on a rear floor.

2. Description of Related Art

In a common vehicle, a spare tire housing for housing a spare tire is provided at a rear floor in a vehicle body rear part. For the vehicle having such a structure, when a load is applied from the vehicle rear, the spare tire moves toward the vehicle front because the spare tire is harder than the vehicle body, and accordingly the spare tire housing may be deformed, and may move to the vehicle front. In particular, since a fuel tank is disposed in front of the spare tire housing, the deformed spare tire housing may unfavorably contact with the fuel tank.

In such a case, countermeasures are conceivable such that the load is absorbed by the surroundings of the spare tire housing by securing a sufficient space between the spare tire housing and a back panel. Also, in the case in which the fuel tank is disposed in front of the spare tire housing, countermeasures are conceivable such that the load is absorbed by the surroundings of the spare tire housing by securing a sufficient distance between the spare tire housing and the fuel tank.

On the other hand, a space for arranging parts other than the spare tire housing and fuel tank must also be secured, and many restrictions are placed on the layout of vehicle body parts. Therefore, the space in the rear of the spare tire housing, the distance between the spare tire housing and the fuel tank, and the like cannot be secured sufficiently in many cases. Also, if an attempt is made to sufficiently secure the space in the rear of the spare tire housing, the distance between the spare tire housing and the fuel tank, and the like, there arises a problem of increased size of vehicle body, which poses a big problem especially in the case of a compact car.

Furthermore, a rear seat is disposed on the front upper side of the spare tire housing, and when a load is applied from the vehicle rear, the spare tire may move to the front upper side. In this case, there arises a problem that the spare tire contacts with the rear seat.

Therefore, in the structure disclosed in, for example, JP 10-316050 A, to avoid the contact of the deformed spare tire housing with the fuel tank, the spare tire is housed in the state in which the front side of the spare tire is raised from the installation position of the fuel tank to tilt the spare tire.

Also, in the structure disclosed in JP 2007-276605 A, to avoid the collision of the deformed spare tire housing with the fuel tank and to prevent the spare tire from contacting with the rear seat, the spare tire is housed in the state in which the front side of the spare tire is raised from the installation position of the fuel tank to tilt the spare tire, and also a fragile part is provided on the vehicle rear side of a spare tire bracket for mounting the center of the spare tire to the spare tire housing. In this case, when a load is applied from the vehicle rear, the spare tire bracket is deformed with the fragile part being a starting point, whereby the front side of the spare tire is further raised, and the spare tire is turned and tilted further.

However, in the case of only the structure in which the spare tire is housed in the state in which the front side of the spare tire is raised from the installation position of the fuel tank to tilt the spare tire as in JP 10-316050 A, the spare tire moves easily toward the front upper side when a load is applied from the vehicle rear. Therefore, the spare tire may still contact with the rear seat.

Also, in the case of a structure in which the fragile part is provided on the spare tire bracket for mounting the spare tire as in JP 2007-276605 A, during the time when the vehicle is running, the spare tire vibrates easily with the fragile part being a starting point. Therefore, noise is generated by the vibrations of the spare tire, and furthermore there arises a problem that the spare tire bracket itself is damaged easily by fatigue cracks.

SUMMARY OF THE INVENTION

The present invention has been made in view of the above circumstances, and accordingly, an object thereof is to provide a lower structure of a vehicle body rear part capable of preventing the occurrence of vibrations of the spare tire during the time when the vehicle is running, capable of preventing the deformation of the spare tire housing to the vehicle front and the movement of the spare tire to the vehicle front, and capable of preventing the movement of the spare tire to the front upper side.

To achieve the above object, the present invention provides a lower structure of a vehicle body rear part, including a spare tire housing formed on a rear floor in the vehicle body rear part; a rear cross member disposed in front of the spare tire housing to connect the right side frame and the left side frame; and a hook reinforcing member for a traction hook, which is disposed in the center in the vehicle width direction of the lower surface of the spare tire housing and extends in the vehicle longitudinal direction, wherein the side frame at the vehicle rear of the rear cross member is divided into a frame front part and a frame rear part in the vehicle longitudinal direction, and the hook reinforcing member is divided into a reinforcing member front part and a reinforcing member rear part in the vehicle longitudinal direction; and the lower structure is configured so that when a load is applied from the vehicle rear to the vehicle body rear part, the side frame is deformed so as to be bent in an upward convex shape or in a downward convex shape at a division position of the frame front part and the frame rear part, and also the rear floor and the hook reinforcing member are deformed so as to be bent in a downward convex shape or an upward convex shape at a division position of the reinforcing member front part and the reinforcing member rear part.

In the present invention, of the side frame at the vehicle rear of the rear cross member, the frame front part has a rigidity higher than that of the frame rear part; of the hook reinforcing member, the reinforcing member rear part has a rigidity higher than that of the reinforcing member front part; and the division position of the frame front part and the frame rear part and the division position of the reinforcing member front part and the reinforcing member rear part coincide with each other in the longitudinal direction.

Also, in the present invention, the rigidity of the frame front part is enhanced by attaching a spring plate reinforcing member, and the rigidity of the reinforcing member rear part is enhanced by making the closed cross sectional area on the lower side larger than that on the upper side and by attaching the traction hook.

Furthermore, in the present invention, both side parts of the rear floor are connected to the right side frame and the left side frame.

Furthermore, in the present invention, the closed cross sectional area of the reinforcing member rear part increases toward the vehicle rear, and a substantially horizontal plane part formed in a maximum closed cross sectional area portion of the reinforcing member rear part is mounted with the traction hook.

Furthermore, in the present invention, the rear floor is provided with a bead extending in the vehicle width direction; the position of the bead, the division position of the frame front part and the frame rear part, and the division position of the reinforcing member front part and the reinforcing member rear part coincide with each other; and the bead in the portion of the spare tire housing is formed in a convex shape projecting downward, and the bead in other portions is formed in a convex shape projecting upward.

As described above, the lower structure of a vehicle body rear part includes a spare tire housing formed on a rear floor in the vehicle body rear part; a rear cross member disposed in front of the spare tire housing to connect the right side frame and the left side frame; and a hook reinforcing member for a traction hook, which is disposed in the center in the vehicle width direction of the lower surface of the spare tire housing and extends in the vehicle longitudinal direction. The side frame at the vehicle rear of the rear cross member is divided into a frame front part and a frame rear part in the vehicle longitudinal direction, and the hook reinforcing member is divided into a reinforcing member front part and a reinforcing member rear part in the vehicle longitudinal direction. The lower structure is configured so that when a load is applied from the vehicle rear to the vehicle body rear part, the side frame is deformed so as to be bent in an upward convex shape or in a downward convex shape at a division position of the frame front part and the frame rear part, and also the rear floor and the hook reinforcing member are deformed so as to be bent in a downward convex shape or an upward convex shape at a division position of the reinforcing member front part and the reinforcing member rear part. Therefore, since the side frames and the rear floor and hook reinforcing member are bent in the reverse direction, the resistance force during bending deformation is increased as compared with the case in which these elements are bent in the same direction, so that the load applied from the vehicle rear to the vehicle body rear part can be absorbed. Herein, the bend in a downward convex shape is also called a valley-form bend (V-shaped bend), and the bend in a upward convex shape is also called a mountain-form bend.

Moreover, according to the lower structure of the present invention, the deformation during load absorption, which is transmitted from the vehicle rear, can be controlled straight to the vehicle front. That is, the valley-form bend (V-shaped bend) has a tendency of raising the vehicle body rear part, and the mountain-form bend has a tendency of lowering the vehicle body rear part. Therefore, the deformation direction is stabilized to the vehicle front by the mixed bend, and the deformation is caused to occur as designed, whereby the load applied from the vehicle rear can be absorbed effectively.

In the present invention, of the side frame at the vehicle rear of the rear cross member, the frame front part has a rigidity higher than that of the frame rear part; of the hook reinforcing member, the reinforcing member rear part has a rigidity higher than that of the reinforcing member front part; and the division position of the frame front part and the frame rear part and the division position of the reinforcing member front part and the reinforcing member rear part coincide with each other in the longitudinal direction. Therefore, when the load is applied from the vehicle rear to the vehicle body rear part, the deformation of the side frame proceeds from the frame rear part having a low rigidity, and on the other hand, the reinforcing member rear part begins to move to the vehicle front on receipt of the load, a bumper member moves to the vehicle front, and the load is transmitted to the reinforcing member front part. At this time, since having a high rigidity, the reinforcing member rear part keeps its shape while being deformed, and the rear end thereof moves upward. Therefore, the rear floor and the hook reinforcing member are deformed into a valley form, and the load applied from the vehicle rear can be absorbed reliably.

Also, in the present invention, the rigidity of the frame front part is enhanced by attaching a spring plate reinforcing member, and the rigidity of the reinforcing member rear part is enhanced by making the closed cross sectional area on the lower side larger than that on the upper side and by attaching the traction hook. Therefore, the above-described effect can be achieved more reliably.

Furthermore, in the present invention, both side parts of the rear floor are connected to the right side frame and the left side frame, so that the spare tire housing portion of the rear floor connected to the hook reinforcing member is bent in a valley form, and on the other hand, the right and left both-end portions of the rear floor connected to the side frames are bent in a mountain form. Therefore, the rear floor is subjected to deformation in different directions such as to be bent in a upward convex shape at both sides and bent in a downward convex shape in the center in the vehicle width direction. In the vicinity of the boundary, deformation is such that complicated wrinkles are produced, so that the efficiency in absorbing the load applied from the vehicle rear can be improved.

Furthermore, in the present invention, the closed cross sectional area of the reinforcing member rear part increases toward the vehicle rear, and a substantially horizontal plane part formed in a maximum closed cross sectional area portion of the reinforcing member rear part is mounted with the traction hook. Therefore, the valley-form bend of the rear floor and the hook reinforcing member, which occurs with the load applied from the vehicle rear, can be promoted.

Furthermore, in the present invention, the rear floor is provided with a bead extending in the vehicle width direction; the position of the bead, the division position of the frame front part and the frame rear part, and the division position of the reinforcing member front part and the reinforcing member rear part coincide with each other; and the bead in the portion of the spare tire housing is formed in a convex shape projecting downward, and the bead in other portions is formed in a convex shape projecting upward. Therefore, the right and left both end portions of the rear floor are reliably bent in a mountain form, and the surroundings of the hook reinforcing member are reliably bent in a valley form, so that the deformation of the rear floor and hook reinforcing member, which occurs with the load applied from the vehicle rear, can further be promoted. Moreover, since the deformation of a panel portion of the rear floor, which is held between the mountain-form bend and the valley-form bend, is a deformation in which the mountain-form bend and the valley-form bend are mixed, the efficiency in absorbing the load applied from the vehicle rear can further be improved.

DETAILED DESCRIPTION OF PREFERRED EMBODIMENTS

Figure 1:
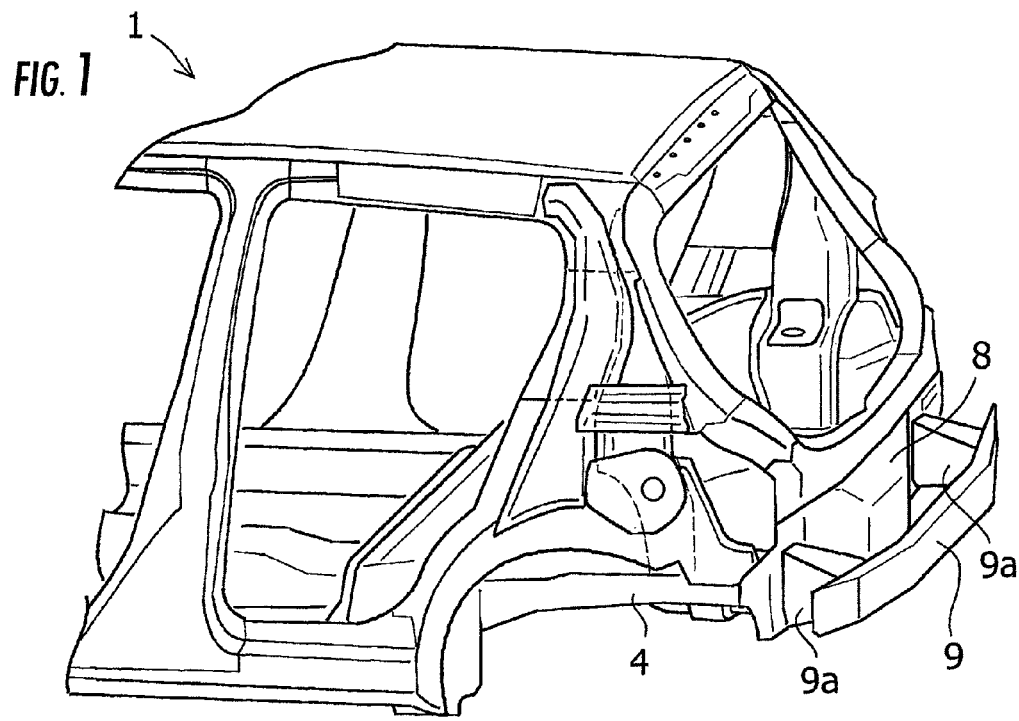
FIG. 1 is a perspective view of a vehicle body rear part of a vehicle to which a lower structure in accordance with an embodiment of the present invention is applied.
Figure 2:
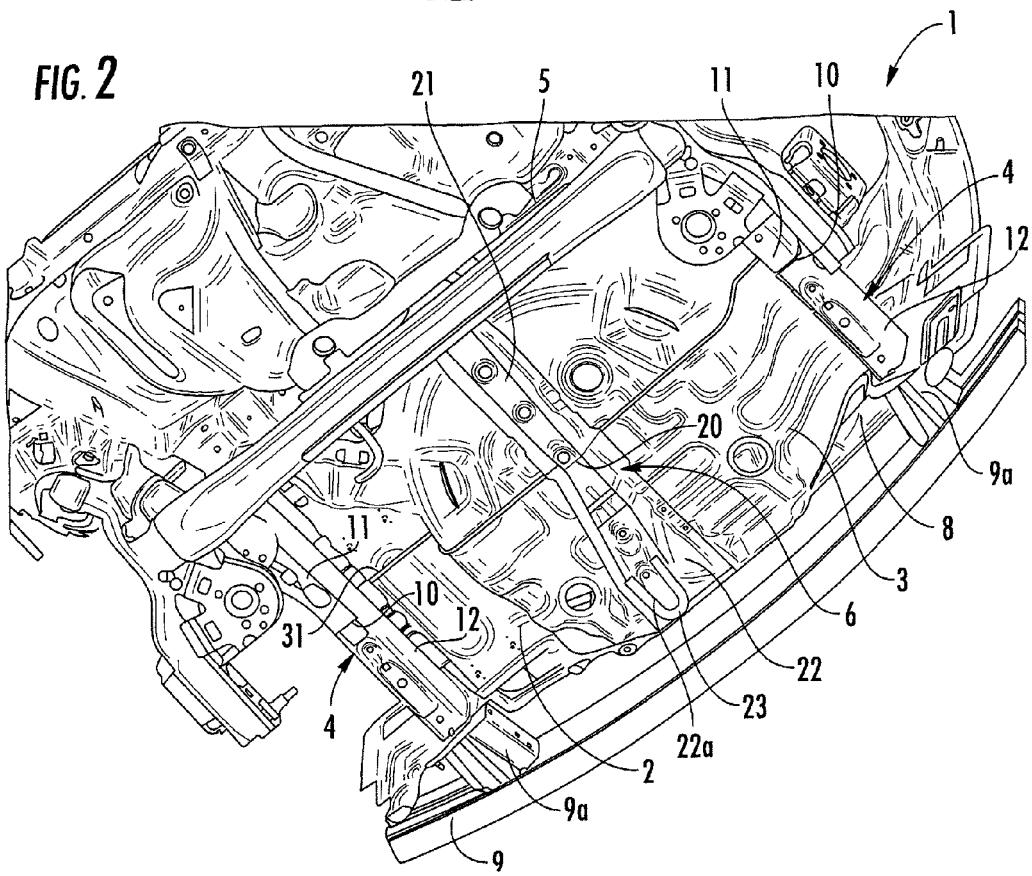
FIG. 2 is a perspective view showing the arrangement relationship of constituent members around a spare tire housing in a vehicle body rear part to which a lower structure in accordance with an embodiment of the present invention is applied, as viewed from the front slantwise lower side.
Figure 3:
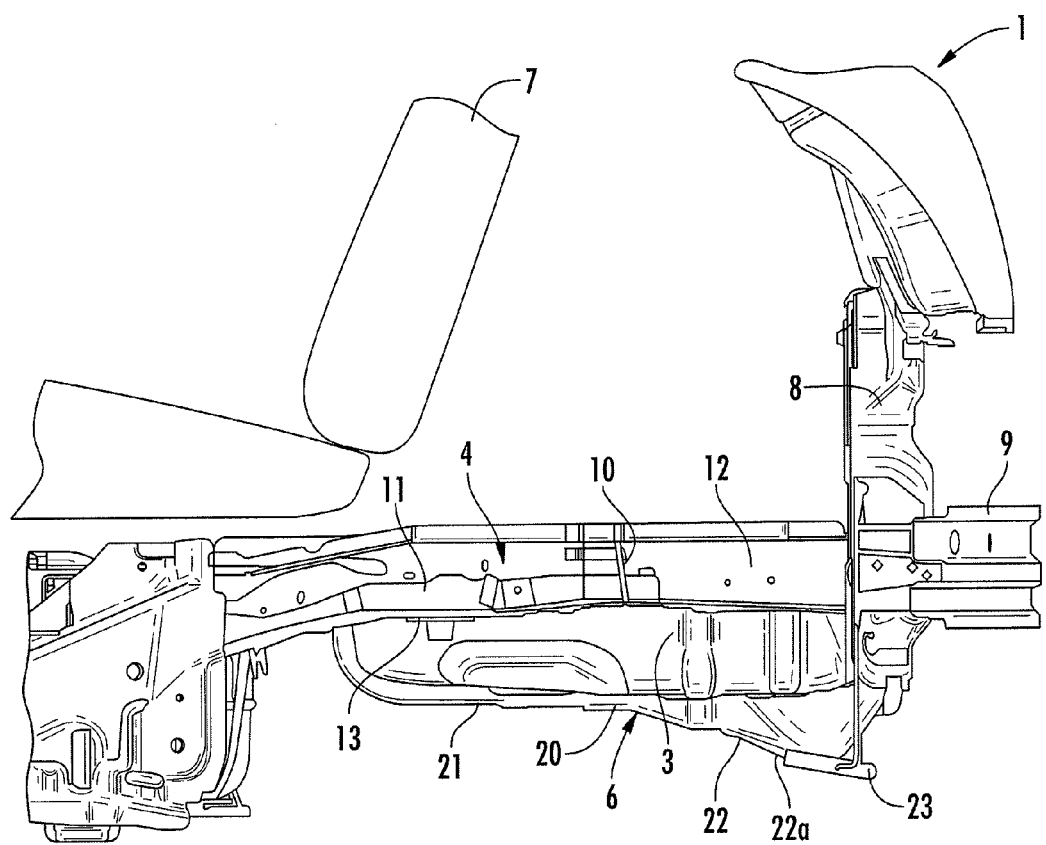
FIG. 3 is a side view showing the arrangement relationship of constituent members around a spare tire housing in a vehicle body rear part to which a lower structure in accordance with an embodiment of the present invention is applied.
Figure 4:
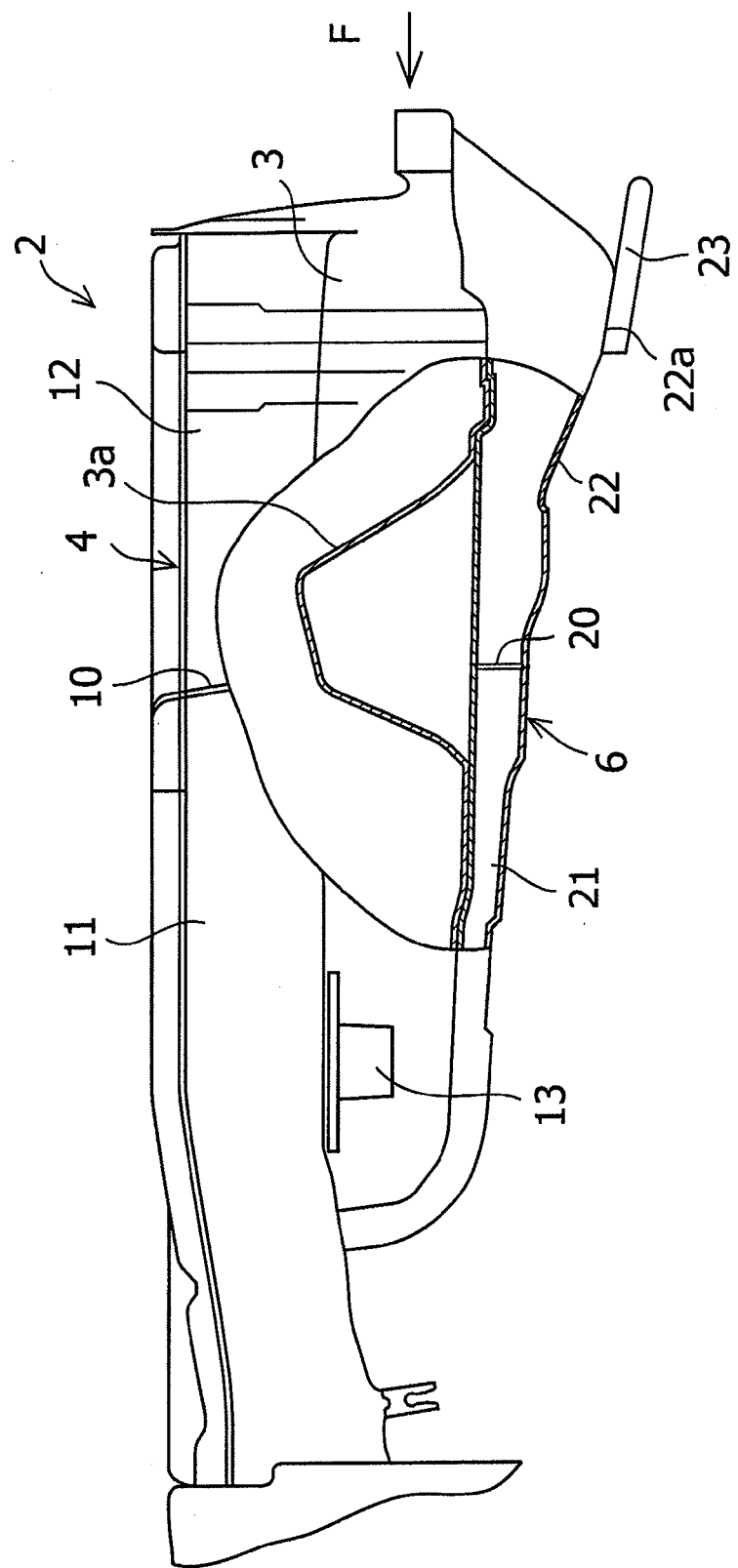
FIG. 4 is a sectional view showing the arrangement relationship of constituent members around a spare tire housing in a vehicle body rear part to which a lower structure in accordance with an embodiment of the present invention is applied.
Figure 5:
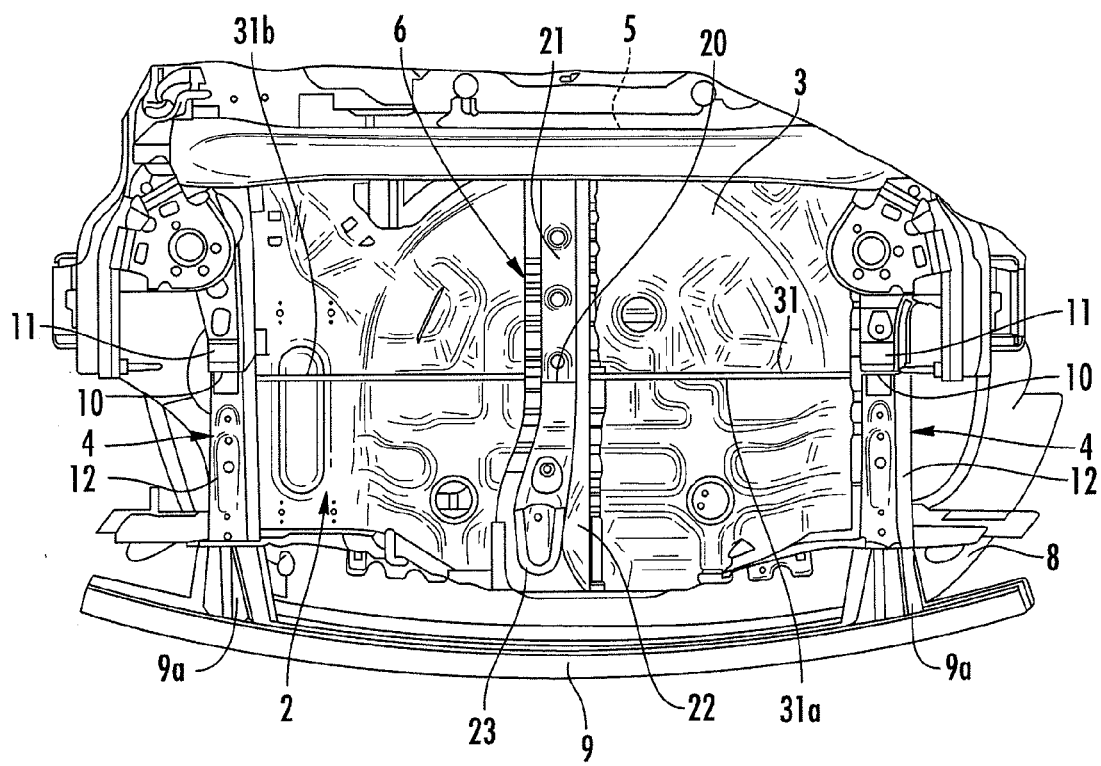
FIG. 5 is a perspective view showing the arrangement relationship of constituent members around a spare tire housing in a vehicle body rear part to which a lower structure in accordance with an embodiment of the present invention is applied, as viewed from the rear slantwise lower side.

The present invention will now be described in detail based on an embodiment shown in the accompanying drawings.

FIGS. 1 to 6 show a lower structure of a vehicle body rear part in accordance with the embodiment of the present invention.

As shown in FIGS. 1 to 5, in the lower portion of a vehicle body rear part 1 of a vehicle in accordance with the embodiment of the present invention, a rear floor 2 is provided, and in a central portion of the rear floor 2, a spare tire housing 3, which is a housing concave part for housing a horizontally placed spare tire ST (refer to FIG. 6), is formed. At a position in front of the spare tire housing 3, a rear cross member 5, which connects the right side frame and the left side frame 4 extending along the vehicle longitudinal direction to each other, is disposed, and the rear cross member 5 extends along the vehicle width direction. Also, in the center in the vehicle width direction on the lower surface of the spare tire housing 3, a hook reinforcing member 6 for a traction hook, extending along the vehicle longitudinal direction, is disposed. Therefore, the lower structure of the vehicle body rear part 1 of this embodiment includes the spare tire housing 3, the side frames 4, the rear cross member 5, and the hook reinforcing member 6. On the rear floor 2 at a position in front of the spare tire housing 3, a rear seat 7 is disposed.

Also, in rear of the spare tire housing 3, a back panel 8 and a rear bumper member 9 are disposed. The rear bumper member 9 is attached to the vehicle body rear part 1 via right and left both-side bumper attachment parts 9a, and the rear end portion of the side frame 4 and the bumper attachment part 9a are arranged in substantially a straight line along the vehicle longitudinal direction.

Furthermore, in the spare tire housing 3, a spare tire bracket 3a for attaching the central portion of the spare tire ST is provided so as to project upward, and the housed spare tire ST is tiltingly disposed in a state of being tilted forward so that the rear portion thereof is positioned above the front portion thereof.

In the lower structure of the vehicle body rear part 1 of this embodiment, the side frame 4 at the vehicle rear of the rear cross member 5 is divided into a frame front part 11 and a frame rear part 12 at a division position 10 in the vehicle longitudinal direction, and the hook reinforcing member 6 is also divided into a reinforcing member front part 21 and a reinforcing member rear part 22 at a division position 20 in the vehicle longitudinal direction. The configuration is made such that when a load is applied from the vehicle rear to the vehicle body rear part 1, the side frame 4 is deformed so as to be bent in an upward convex shape (bent in a mountain form) at the division position 10 of the frame front part 11 and the frame rear part 12, and also the rear floor 2 and the hook reinforcing member 6 are deformed so as to be bent in a downward convex shape (bent in a valley form) at the division position 20 of the reinforcing member front part 21 and the reinforcing member rear part 22.

Therefore, the frame front part 11 of the side frame 4 at the vehicle rear of the rear cross member 5 has a rigidity enhanced by the attachment of a spring plate reinforcing member 13, and thus has a rigidity higher than that of the frame rear part 12.

Also, the hook reinforcing member 6 is formed so as to have a hat-shaped cross section, and, in a state of being attached to the lower surface of the rear floor 2, has a closed cross-sectional shape together with the rear floor 2. Moreover, of the hook reinforcing member 6, the reinforcing member rear part 22 has a larger closed cross sectional area on the lower side than on the upper side, and this closed cross sectional area increases toward the vehicle rear. Also, in a portion in which the closed cross sectional area is at a maximum of the reinforcing member rear part 22, a substantially horizontal plane part 22a is formed. To this substantially horizontal plane part 22a, a traction hook 23 the front end portion of which is fixed by welding is attached. The rear end portion of the traction hook 23 is arranged in a state of being projected slantwise downward from the reinforcing member rear part 22 toward the vehicle rear. Due to the above-described configuration, the reinforcing member rear part 22 has an enhanced rigidity, and thus has a rigidity higher than that of the reinforcing member front part 21.

Furthermore, the division position 10 of the frame front part 11 and the frame rear part 12 and the division position 20 of the reinforcing member front part 21 and the reinforcing member rear part 22 are arranged so as to coincide with each other in the vehicle longitudinal direction.

On the other hand, both side portions of the rear floor 2 are connected to the side frames 4 arranged at the right and left on both sides. Also, the rear floor 2 is provided with a bead 31 that is a ridge part extending along the vehicle width direction. The position of this bead 31, the division position 10 of the frame front part 11 and the frame rear part 12 of the side frame 4, and the division position 20 of the reinforcing member front part 21 and the reinforcing member rear part 22 of the hook reinforcing member 6 are arranged so as to coincide with each other in the vehicle longitudinal direction. Moreover, a central bead part 31a in the portion of the spare tire housing 3 is formed in a convex shape projecting downward, and a side bead part 31b in other portions is formed in a convex shape projecting upward. The configuration is made such that the rear floor 2 is deformed so as to be bent in the reverse direction corresponding to the installation locations of the side frames 4 and the hook reinforcing member 6.

Figure 6A:
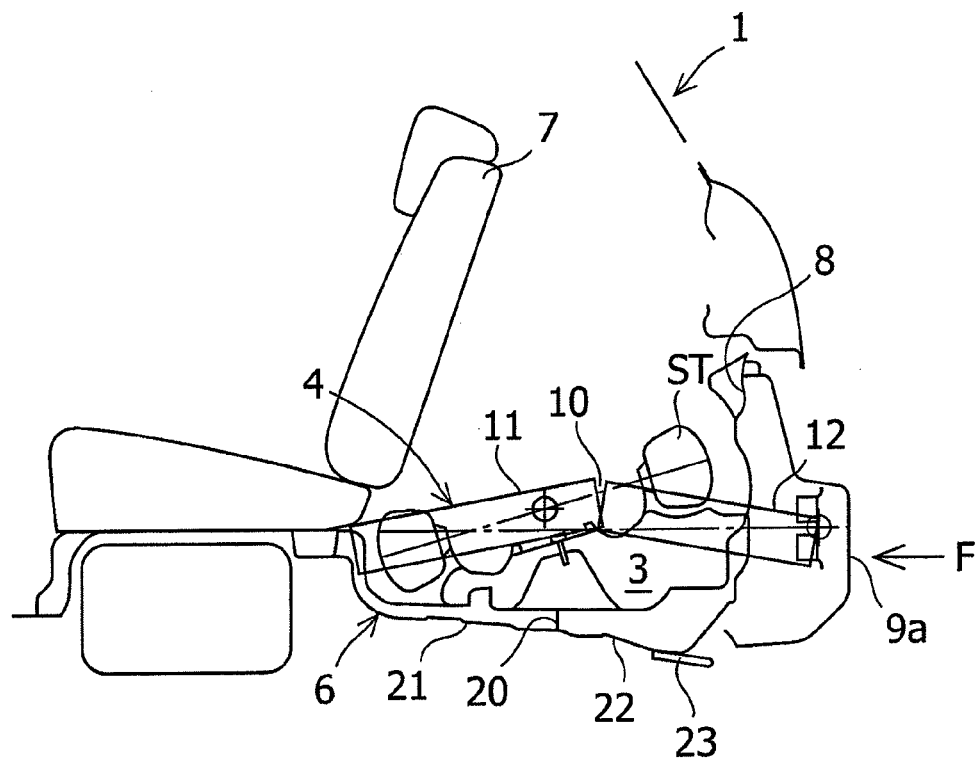
FIGS. 6A and 6B are side views showing a state in which a load is applied from the vehicle rear to a vehicle body rear part in the vehicle body rear part to which a lower structure in accordance with an embodiment of the present invention is applied, FIG. 6A being a side view showing the initial state, and FIG. 6B being a side view showing the final state.

On the vehicle to which the lower structure of the vehicle body rear part 1 in accordance with the embodiment of the present invention is applied, as shown in FIG. 6A, when a load F is applied to the rear bumper member 9 of the vehicle body rear part 1 from the vehicle rear toward the vehicle front, the load F is transmitted to the rear portion of the side frame 4 via the bumper attachment part 9a. Thereby, the side frame 4 is deformed so that the rear end of the frame front part 11 and the front end of the frame rear part 12 are slightly raised at the division position 10 of the frame front part 11 and the frame rear part 12, and the side frame 4 is bent in an upward convex shape, that is, in a mountain form.

Figure 6B:
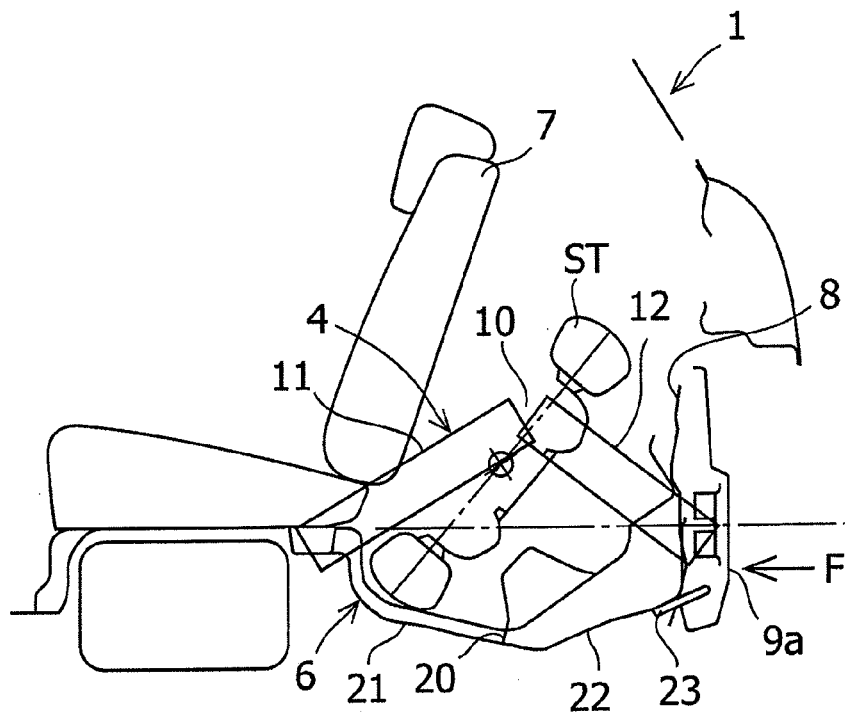

As shown in FIG. 6B, when the load F is further applied to the back panel 8 of the vehicle body rear part 1 and the rear floor 2 from the vehicle rear toward the vehicle front, the load F is transmitted to the rear portions of the side frames 4, the spare tire housing 3, and the hook reinforcing member 6. Accordingly, the side frame 4 is deformed so that the rear end of the frame front part 11 and the front end of the frame rear part 12 are greatly raised at the division position 10, and the side frame 4 is bent in an upward convex shape at an acute angle. At the same time, while the spare tire housing 3 is deformed, the rear floor 2 and the hook reinforcing member 6 are deformed so as to be bent in a downward convex shape, that is, in a valley form at the installation position of the bead 31 and the division position 20 of the reinforcing member front part 21 and the reinforcing member rear part 22.

When the side frames 4 and the rear floor 2 and hook reinforcing member 6 are bendingly deformed in the reverse direction, a great resistance force is generated, so that the load F applied from the vehicle rear to the vehicle body rear part is absorbed. Also, if the spare tire housing 3 is deformed by the load F, the rear portion of the spare tire ST placed so as to tilt forward jumps up with the front portion thereof being the center, and is turned in the longitudinal direction toward the vehicle front.

Thus, in the lower structure of the vehicle body rear part 1 in accordance with the embodiment of the present invention, the side frame 4 at the vehicle rear of the rear cross member 5 is divided into the frame front part 11 and the frame rear part 12 in the vehicle longitudinal direction, and the hook reinforcing member 6 is divided into the reinforcing member front part 21 and the reinforcing member rear part 22 in the vehicle longitudinal direction, so that when the load F is applied from the vehicle rear to the vehicle body rear part 1, the side frame 4 is deformed so as to be bent in an upward convex shape at the division position 10 of the frame front part 11 and the frame rear part 12, and also the rear floor 2 and the hook reinforcing member 6 are deformed so as to be bent in a downward convex shape at the installation position of the bead 31 and the division position 20 of the reinforcing member front part 21 and the reinforcing member rear part 22. Therefore, the side frames 4 and the rear floor 2 and hook reinforcing member 6 are bent in the reverse direction. As a result, the resistance force during bending deformation is increased as compared with the case in which these elements are bent in the same direction, so that the load F applied from the vehicle rear to the vehicle body rear part 1 is absorbed. Thereby, the movement of the rear cross member 5, the side frames 4, the spare tire housing 3, and the like to the vehicle front can be inhibited effectively, and the fuel tank and the like positioned in front of the spare tire housing 3 can be prevented from being damaged. Also, the rules for regulating fuel leakage caused by the load F applied from the vehicle rear can be complied with, and also the spare tire ST can be prevented from contacting with the rear seat 7 by controlling the behavior of the spare tire ST.

Also, in the lower structure of this embodiment, of the side frame 4 at the vehicle rear of the rear cross member 5, the frame front part 11 has a rigidity higher than that of the frame rear part 12, and of the hook reinforcing member 6, the reinforcing member rear part 22 has a rigidity higher than that of the reinforcing member front part 21. Also, the division position 10 of the frame front part 11 and the frame rear part 12 and the division position 20 of the reinforcing member front part 21 and the reinforcing member rear part 22 coincide with each other in the longitudinal direction. Therefore, when the load F is applied from the vehicle rear to the vehicle body rear part 1, the deformation of the side frame 4 proceeds from the frame rear part 12 having a low rigidity via the bumper attachment part 9a of the rear bumper member 9, and on the other hand, the reinforcing member rear part 22 begins to move to the vehicle front on receipt of the load F, the rear bumper member 9 moves to the vehicle front, and the load F is transmitted to the reinforcing member front part 21. At this time, since it has a high rigidity, the reinforcing member rear part 22 keeps its shape while being deformed, and the rear end thereof moves upward. Therefore, the rear floor 2 and the hook reinforcing member 6 are deformed into a valley form, and the load F applied from the vehicle rear can be absorbed effectively.

The above is a description of the embodiment of the present invention. The present invention is not limited to the above-described embodiment, and various modifications and changes can be made based on the technical concept of the present invention.

For example, in the above-described embodiment, the configuration is such that when the load F is applied from the vehicle rear to the vehicle body rear part 1, the side frame 4 is deformed so as to be bent in an upward convex shape (bent in a mountain form) at the division position 10 of the frame front part 11 and the frame rear part 12, and also the rear floor 2 and the hook reinforcing member 6 are deformed so as to be bent in a downward convex shape (bent in a valley form) at the division position 20 of the reinforcing member front part 21 and the reinforcing member rear part 22. However, if the configuration is made such that the side frame 4 is bent in a valley form at the division position 10, and the rear floor 2 and the hook reinforcing member 6 are bent in a mountain form by changing the degree of rigidity etc. in the longitudinal direction, the same effect is achieved.

What is claimed is:

1. A lower structure of a vehicle body rear part, comprising:
  a spare tire housing formed on a rear floor in the vehicle body rear part, the spare tire housing having a lower surface;
  a side frame comprising a right side frame disposed on a right side of the rear floor and a left side frame disposed on a left side of the rear floor, each of the right side and left side frames extending in a vehicle longitudinal direction;
  a rear cross member disposed in front of the spare tire housing and extending in a vehicle width direction to connect the right side frame and the left side frame of the vehicle body rear part, the right side frame and the left side frame respectively extending rearwardly of the rear cross member; and
  a hook reinforcing member for a traction hook, the hook reinforcing member extending in the vehicle longitudinal direction and being disposed in the center of the lower surface of the spare tire housing with respect to the vehicle width direction,
  wherein the side frame defines a division position at which each of the right side and left side frames is divided into a frame front part and a frame rear part, and wherein the hook reinforcing member defines a division position at which the hook reinforcing member is divided into a reinforcing member front part and a reinforcing member rear part,
  so that when a load is applied from the vehicle rear to the vehicle body rear part, the side frame is deformed so as to be bent in an upward convex shape at said division position of the frame front part and frame rear part, and the rear floor and the hook reinforcing member are deformed so as to be bent in a downward convex shape at said division position of the reinforcing member front part and the reinforcing member rear part.

2. The lower structure of a vehicle body rear part according to claim 1, wherein the frame front part of the side frame has a rigidity higher than that of the frame rear part; the reinforcing member rear part of the hook reinforcing member has a rigidity higher than that of the reinforcing member front part; and the division position of the frame front part and the frame rear part and the division position of the reinforcing member front part and the reinforcing member rear part coincide with each other in the longitudinal direction.

3. The lower structure of a vehicle body rear part according to claim 2, wherein the rigidity of the frame front part is enhanced by a spring plate reinforcing member attached to the frame front part, and the rigidity of the reinforcing member rear part is enhanced by the traction hook being attached to a substantially horizontal plane part formed in the reinforcing member rear part and by making a closed cross sectional area on a lower side of the reinforcing member rear part larger than that on an upper side of the reinforcing member rear part.

4. The lower structure of a vehicle body rear part according to claim 1, wherein the rear floor is connected to both the right side frame and the left side frame.

5. The lower structure of a vehicle body rear part according to claim 2, wherein the reinforcing member rear part has a closed cross sectional area that increases toward the vehicle rear and reaches a maximum closed cross sectional area at a position where a substantially horizontal plane part of the reinforcing member rear part is formed at a lower surface of the reinforcing member rear part, and wherein the traction hook is attached to said horizontal plane part of the reinforcing member rear part.

6. The lower structure of a vehicle body rear part according to claim 1, wherein the rear floor is provided with a bead extending in the vehicle width direction, the bead having a central bead part in a portion of the rear floor adjacent the spare tire housing and a side bead part in other portions of the rear floor; the position of the bead, the division position of the frame front part and the frame rear part, and the division position of the reinforcing member front part and the reinforcing member rear part coincide with each other; and the central bead part is formed in a convex shape projecting downward, and the side bead part is formed in a convex shape projecting upward.

* * * * *